United States Patent [19] [11] 3,709,614
Hayakawa [45] Jan. 9, 1973

[54] DETECTOR APPARATUS FOR PARTICULATE CONTAMINANTS IN A FLUID UTILIZING PARALLEL FLOW PATHS

[75] Inventor: Osamu Hayakawa, Tokyo, Japan

[73] Assignee: Kabushikikaisha Tokyo Keiki, Tokyo, Japan

[22] Filed: Dec. 1, 1970

[21] Appl. No.: 94,077

[30] Foreign Application Priority Data

Dec. 13, 1969 Japan..............................44/117997

[52] U.S. Cl...............356/208, 73/432 PS, 250/218, 356/102
[51] Int. Cl....G01n 21/06, G01n 21/26, G01n 21/02
[58] Field of Search..................356/36, 37, 102–104, 356/207–208; 250/218; 73/28, 61, 432 PS

[56] References Cited

UNITED STATES PATENTS

| 3,200,700 | 8/1965 | Topol | 250/218 X |
|---|---|---|---|
| 3,255,441 | 6/1966 | Goodwin et al. | 250/218 X |
| 3,207,026 | 9/1965 | Churchill et al. | 250/218 X |
| 3,435,238 | 3/1969 | Hall et al. | 250/218 |
| 2,978,067 | 4/1961 | Tuthill | 250/218 X |
| 3,059,470 | 10/1962 | Baldwin et al. | 73/28 X |
| 3,439,800 | 4/1969 | Tonjes | 73/432 PS X |

Primary Examiner—Ronald L. Wibert
Assistant Examiner—V. P. McGraw
Attorney—Hill, Sherman, Meroni, Gross & Simpson

[57] ABSTRACT

A detector apparatus for particulate contaminants in a fluid utilizing parallel flow paths to selectively guide the fluid being tested through one of such flow paths and into a detector means having means for producing a signal responsive to variations in the quantity of contaminants in the fluid and means for receiving the signal and converting it to indicia indicating the amount of a given particle size in the fluid. Each of the flow paths has a filter with a select mesh size therein.

3 Claims, 2 Drawing Figures

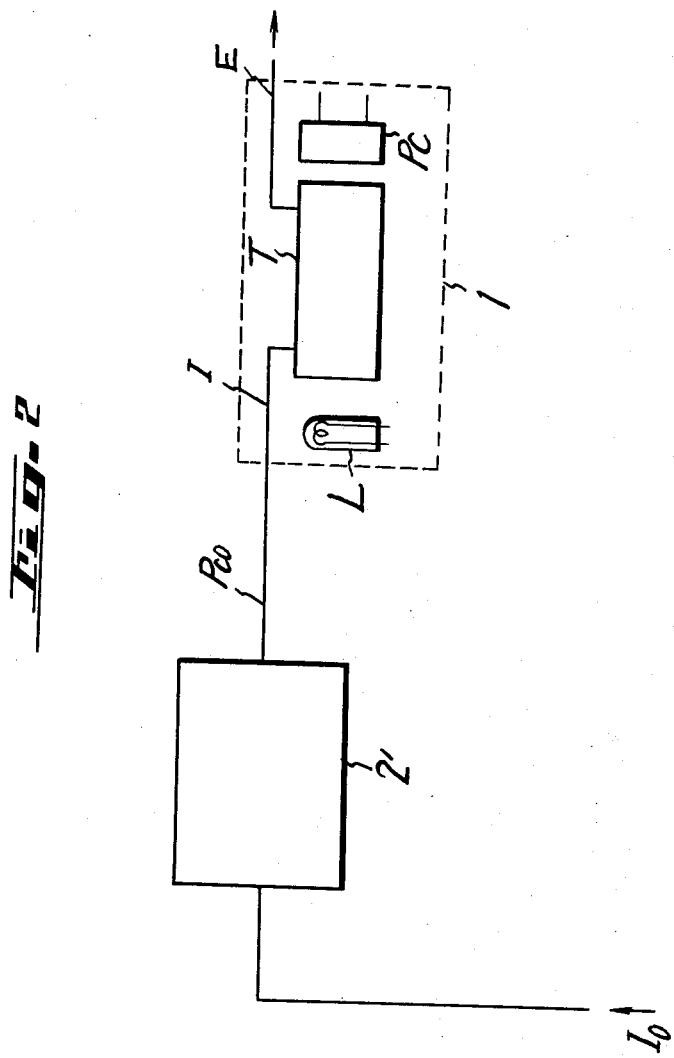

DETECTOR APPARATUS FOR PARTICULATE CONTAMINANTS IN A FLUID UTILIZING PARALLEL FLOW PATHS

BACKGROUND OF THE INVENTION

1. Field of the Invention

This invention relates to a detector for detecting contaminants mixed in a fluid and quantitatively determining the contaminants according to their particle size.

2. Description of the Prior Art

For continuous detection and quantitative determination of contaminats in a fluid, for example, foreign substances such as dust and the like in an oil used in an oil pressure device, there have heretofore been proposed various devices such as those utilizing transmission or scattering characteristics of supersonic waves or light in a fluid to be measured, those utilizing variations in the electric characteristics of the fluid to be measured due to mixture of foreign substances therein and so on.

However, the devices utilizing the variations in the electric characteristics is based upon the electric resistance or capacity of the fluid to be measured which varies with the amount of the contaminants mixed in the fluid, so that the amount of the contaminants can be measured but the size of the contaminants, namely their particle size and their distribution cannot be detected.

Further, some of the devices utilizing the transmission or scattering characteristics of supersonic waves or light enable detection of the numbers of contaminants according to their particle size but a measuring unit therefor is required to be of high precision and hence inevitably increases the cost of the devices.

SUMMARY OF THE INVENTION

Accordingly, the present invention has for its object the provision of an inexpensive detector which is capable of rapid quantitative determination of contaminants mixed in a fluid according to their particle size.

BRIEF DESCRIPTION OF THE DRAWING

FIG. 2 is a schematic diagram illustrating another example of this invention.

DESCRIPTION OF THE PREFERRED EMBODIMENTS

Figure 1:
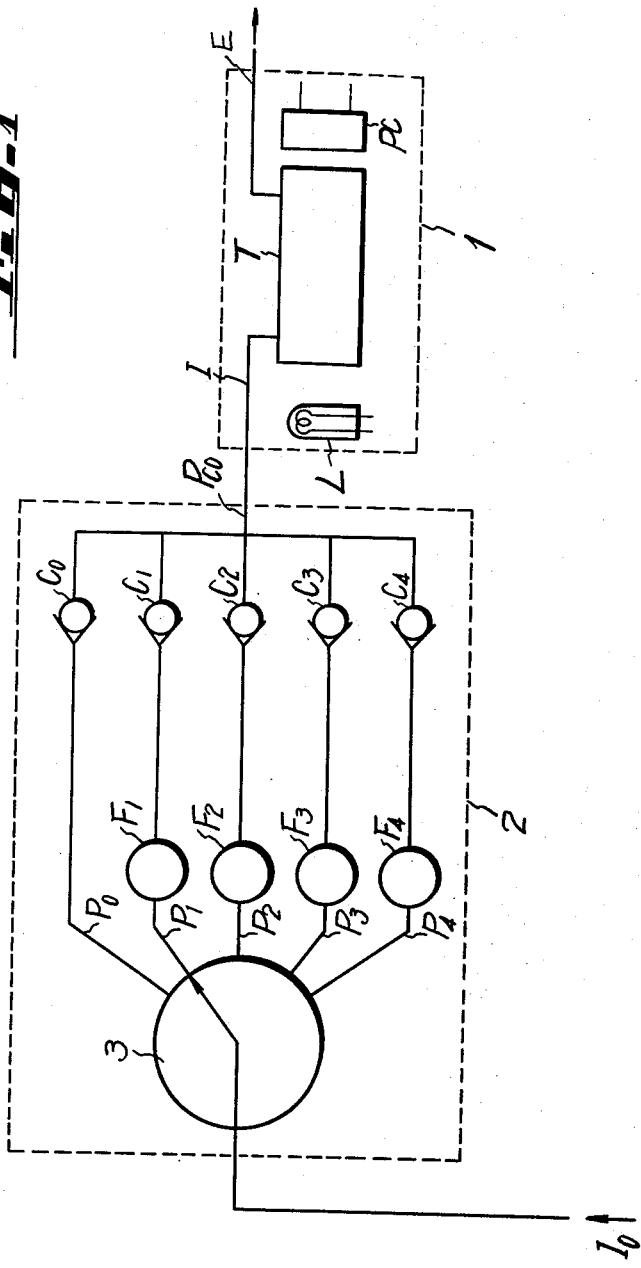
FIG. 1 is a schematic diagram showing one example of the detector of this invention.

With reference to the drawings the present invention will hereinafter be described. In FIG. 1 reference numeral 1 indicates a contaminant detector of the type that variations in the amount of, for example, light having passed through a fluid to be measured are converted by a photoconductive element into corresponding resistance variations for quantitative determination of the amounts of the contaminants contained in the fluid according to their particle size. Upstream of the detector 1 there are provided pipe lines $P_1$, $P_2$, $P_3$ and $P_4$ having respectively inserted thereinto, for example, four kinds of filters $F_1$, $F_2$, $F_3$ and $F_4$ and another pipe line $P_0$ having no filter, in other words, having inserted thereinto a filter of infinite mesh size. The fluid to be measured is introduced into the detector 1 through one of the pipe lines $P_0$ to $P_4$. The detector 1 surrounded by a broken line is a known detector of the type utilizing, for example, the light transmission characteristic and this detector includes a detecting tube T, a light source L provided at one end of the tube T for irradiating the fluid introduced into the tube T, a photoconductive element PC provided at the other end of the tube T for converting the amount of light having passed through the tube T into a corresponding electric resistance, an inlet I for introducing the fluid into the tube T and an outlet E for exhausting the fluid therefrom. Reference numeral 2 designates generally a discriminator circuit, surrounded by a broken line, which includes the pipe lines $P_1$ and $P_4$ having respectively inserted thereinto the filters $F_1$ to $F_4$ of different mesh sizes $f_1$ to $f_4$, the pipe line $P_0$ with no filter, a change-over unit 3 for supplying the fluid to be measured introduced from a fluid inlet $I_0$ selectively to any one of the pipe lines $P_0$ to $P_4$, check valves $C_1$ to $C_4$ respectively inserted into the pipe lines $P_1$ to $P_4$, for example, downstream of the filters $F_1$ to $F_4$ for preventing a backward flow of the fluid and a check valve $C_0$ inserted into the pipe line $P_0$ also for preventing a backward flow of the fluid. That is, the check valves $C_0$ to $C_4$ ensure the fluid introduced from the inlet $I_0$ to flow through the pipe lines $P_0$ to $P_4$ only in a direction of the detector 1. The downstream ends of the pipe lines $P_0$ to $P_4$ are interconnected at a pipe line $P_{CO}$ and this pipe line $P_{CO}$ is connected to the fluid inlet I of the detecting tube T.

In the device of this invention constructed as above described, the fluid flowing into the discriminator circuit 2 from the fluid inlet $I_0$ runs into the detector 1 through any one of the pipe lines $P_0$ to $P_4$ determined by the change-over unit 3 and flows out from the fluid outlet E of the detector T. If the outputs of the detector 1 when flowing the fluid in the pipe lines $P_0$ to $P_4$ with the adjustment of the change-over unit 3 are taken as $\alpha_0$, $\alpha_1$, $\alpha_2$, $\alpha_3$ and $\alpha_4$ respectively (in this case, let it be assumed that the mesh sizes $f_1$ to $f_4$ of the filters $F_1$ to $F_4$ become smaller in this order), $\alpha_0-\alpha_1$, $\alpha_1-\alpha_2$, $\alpha_2-\alpha_3$, $\alpha_3-\alpha_4$ and $\alpha_4$ respectively represent the amounts of the contaminants of particle sizes $d$ ($d>f_1$), $d_1$ ($f_1>d_1>f_2$), $d_2$ ($f_2>d_2>f_3$), $d_3$ ($f_3>d_3>f_4$) and $d_4$ ($f_4>d_4$). Thus, the contaminants can be quantitatively determined according to five particle sizes independently.

FIG. 2 illustrates a modified form of this invention, in which only one pipe line $P_{CO}$ is employed in place of the discriminator circuit 2 including the plurality of parallel pipe lines $P_0$ to $P_4$ and the change-over unit 3 depicted in FIG. 1 and the pipe line $P_{CO}$ includes a discriminator circuit 2' adapted such that a plurality of filters of different mesh sizes can be selectively inserted thereinto. Other components and the operation of this example are exactly the same as those of FIG. 1.

Although the present invention has been described in connection with the detector 1 of the type utilizing the light transmission characteristic, the invention may be practiced with other types of detectors. Further, by increasing the number of the parallel pipe lines and selecting different the mesh sizes of filters to be inserted thereinto or the number of the filters with different mesh size, the contaminants can be quantitatively determined with more detail and precision. In addition, the check valves $C_0$ to $C_4$ in FIG. 1 can be left out by connecting the downstream ends of the parallel pipe lines $P_0$ to $P_4$ to the pipe line $P_{CO}$ through another pipe line changeover unit for changing over the respective pipe lines $P_0$ to $P_4$.

With the addition of a device of extremely simple construction, the present invention ensures rapid, accurate and easy quantitative determination of contaminants in a fluid according to their particle size which has been regarded as impossible or extremely difficult in the past.

It will be apparent that many modifications and variations may be effected without departing from the scope of the novel concepts of this invention.

I claim:

1. In a detector device for continuously testing a fluid and quantitatively determining the presence of particulate contaminants in the fluid including a fluid contaminant detector means having means for producing a signal responsive to variations in the quantity of contaminants in the fluid and a means for receiving said signal and converting it to indicia indicating the amount of a given particle size in the fluid, the improvement comprising:

a change-over member having a conduit for receiving the fluid from a source thereof and means for selectively guiding the fluid to given locations, a plurality of parallel conduits each in fluid communication with said change-over member at one of said given locations, a filter positioned in each of said parallel conduits, said filter having a mesh size different from an adjacent filter mesh size, and an interconnecting conduit in fluid communicating with each of said parallel conduits and with a fluid inlet of said fluid detector contaminant means.

2. In a detector device as defined in claim 1 wherein one of the filters has an infinite mesh size.

3. In a detector device as defined in claim 1 wherein a check valve is positioned in each of the parallel conduits between the filter therein and the interconnecting conduit.

* * * * *